United States Patent [19]

Leenhouts et al.

[11] 4,081,736

[45] Mar. 28, 1978

[54] OPEN LOOP MOTOR STABILIZATION METHOD AND CIRCUIT

[75] Inventors: Albert C. Leenhouts, Harwinton; Gurdial Singh, Avon, both of Conn.

[73] Assignee: The Superior Electric Company, Bristol, Conn.

[21] Appl. No.: 704,005

[22] Filed: Jul. 9, 1976

[51] Int. Cl.² .......................................... H02K 37/00
[52] U.S. Cl. ..................................... 318/696; 318/685; 318/138
[58] Field of Search ............... 318/696, 685, 254, 431, 318/138

[56] References Cited

U.S. PATENT DOCUMENTS

| | | | |
|---|---|---|---|
| 3,732,480 | 5/1973 | Hendrickson et al. | 318/385 |
| 3,742,329 | 6/1973 | Giguere | 318/138 |
| 3,818,261 | 6/1974 | Clarke, Jr. | 318/696 |
| 3,990,014 | 11/1976 | Hakozaki | 318/696 |

Primary Examiner—Herman Hohauser
Attorney, Agent, or Firm—Ernest M. Junkins

[57] ABSTRACT

The tendency of a stepping motor to oscillate or flutter under some mid-velocity conditions is minimized by reducing the deviation of the motor's rotor from its normal synchronous position by altering the time about a nominal time when a change of energization of the motor's windings is to occur after receipt of an input pulse in accordance with the duration of the decay current that existed at the prior change of energization.

22 Claims, 6 Drawing Figures

OPEN LOOP MOTOR STABILIZATION METHOD AND CIRCUIT

The present invention relates to stepping motors, such as shown in U.S. Pat. No. 2,931,929, assigned to the assignee of the present invention in which each change of energization of its windings produces a step. The motor is energized by a pulse-to-step motor control which accepts input pulses and, for each input pulse, essentially simultaneously effects a change of energization of the motor windings with the changes occurring in a repeating sequence. If the motor does not respond to a change to produce a step, its operation is unsatisfactory and one form of such undesirable operation, occurs when the motor uncontrollably oscillates. The tendency of the motor to oscillate is present throughout its operating range with the most objectionable being those that occur during the mid-velocity range of operation of the motor.

These oscillating tendencies have been heretofor recognized and have thus been somewhat detrimental to the universal application of such motors. One attempt to minimize the tendency has been directed to adding mechanical dampening devices but such devices not only had to be usually specifically tailored to each application of the motor but also subtracted from the motor's capabilities. Another approach has been to sense the actual position of the motor's rotor by a closed loop system that includes an encoder and then change the rate of the changes of energization so that the rotor's position dictates when the next change is to occur. A further approach has involved the modification of the drive current by passive electrical components as shown in U.S. Pat. No. 3,684,934, assigned to the assignee of the present invention. Though these attempts have been somewhat successful, they have not been completely satisfactory for many reasons including the cost of the devices, the increase in the space required by the motor, the altering of the motor's capability and difference in speed with respect to the rate of the input pulses.

It is accordingly an object of the present invention to provide a method and system for minimizing the tendency of a stepping motor to oscillate or flutter at least during its mid-velocity operating range by a system that is completely electrical and is capable of independent use or use with other motor stabilization methods and systems.

Another object of the present invention is to achieve the above object with a method and system that does not alter the relationship between the speed of the motor and the rate of the input pulses so that the motor operates at the speed set by the rate of the input pulses and which also does not decrease the motor's capability.

A further object of the present invention is to achieve the above results with a method and system that is readily incorporated into existing pulse-to-step motor controls and which is capable of being used with different size motors and in different motor applications with a minimum, if any, adjustment.

Still another object of the present invention is to provide a method and system for minimizing the oscillatory tendencies of a stepping motor that is extremely economical to manufacture.

In carrying out the present invention one form of a pulse-to-step motor control for operating the above-noted stepping motor is disclosed in U.S. Pat. No. 3,177,268 also assigned to the assignee of the present invention. Each input pulse received essentially simultaneously causes a change of energization of the motor windings which in turn then attracts the motor's rotor to the new winding energization position to produce a step.

The rotor thus steps at the same frequency as the rate of the changes and hence of the input pulses but in the mid-velocity operating range the steps are not discrete and the motor acts as a synchronous motor following the rotating magnetic field of the stator. Each change of energization has the current from the power supply through at least one of the motor windings terminated. As each winding of the motor is an inductance, when the energization of a winding is removed or reversed, a current persists during the decay of the magnetic flux. This continued current occurs almost always with each change of energization and is herein called a decay current.

When the motor is functioning as a synchronous motor, the rotor is magnetically connected to the rotating stator field and tends to follow it. The magnetic connection is analogous to a mechanical spring connection so that the rotor does not always maintain the same relative synchronous position with respect to the stator field and thus deviates from the stator commanded synchronous position. The duration and extent of the deviation is variable and the deviation changes in a manner essentially corresponding to a sine wave so that it appears as an oscillatory velocity variation of the motor's speed.

Thus, the motor's rotor accelerates to a higher velocity and decelerates to a lower velocity, then accelerates to a higher velocity than the rotating stator field, etc. This oscillatory motion has a frequency that is quite small compared to the actual midrange operating velocity being in a range of perhaps 5 to 20 per cent thereof.

It has been determined that when the extent of the deviation causes the rotor velocity to be greater than ± 10% of the rotating stator field speed, the motor's inherent motivation to maintain the synchronous relationship between the rotating stator field and the rotor decreases and thus offers insufficient resistance to the extent of the deviation increasing. The deviation extent thus tends to be self-reinforcing and may increase in magnitude to cause the motor to flutter and lose synchronism completely.

Applicants have found that there is a relationship between the deviation of the rotor from its synchronous position and the extent of the duration of the decay current that occurs during a change of energization. When the rotor's velocity is greater than the synchronous speed, the decay current duration has been found to be less than its duration when the rotor is in synchronism with the stator magnetic field while when the rotor speed is less than the stator synchronous speed, the duration is greater. Further, the extent of the duration has also been found to be related to the extent of the deviation. The present method and system uses the extent of the duration of the decay current and especially the relative change of the extent that occurs at one energization change to determine when the next change of energization should be applied to the motor to tend to minimize the deviation.

The method thus involves initially providing a nominal delay between the receipt of an input pulse and the effecting of a change in the winding's energizations. When the rotor is accelerating with respect to the stator field, the increasing of the extent of the decay current duration is sensed and is used to decrease the delay time below its nominal value so that the next change of energization occurs quicker after receipt of an input pulse than nominally. When the rotor is moving at a lesser velocity than the stator field velocity, the decay current extent decreases, and is used to increase the delay between the receipt of the input pulse and its change of energization. In both instances, the delay in the time of the change of energization is made to occur in a direction which tends to decrease the deviation by altering the stator field position and hence enhances the inherent desire of the motor to remain in synchronism, thereby tending to minimize the possibility of the deviation increasing in amplitude and producing an unsatisfactory operating condition.

Other features and advantages will hereinafter appear.

Figure 1:
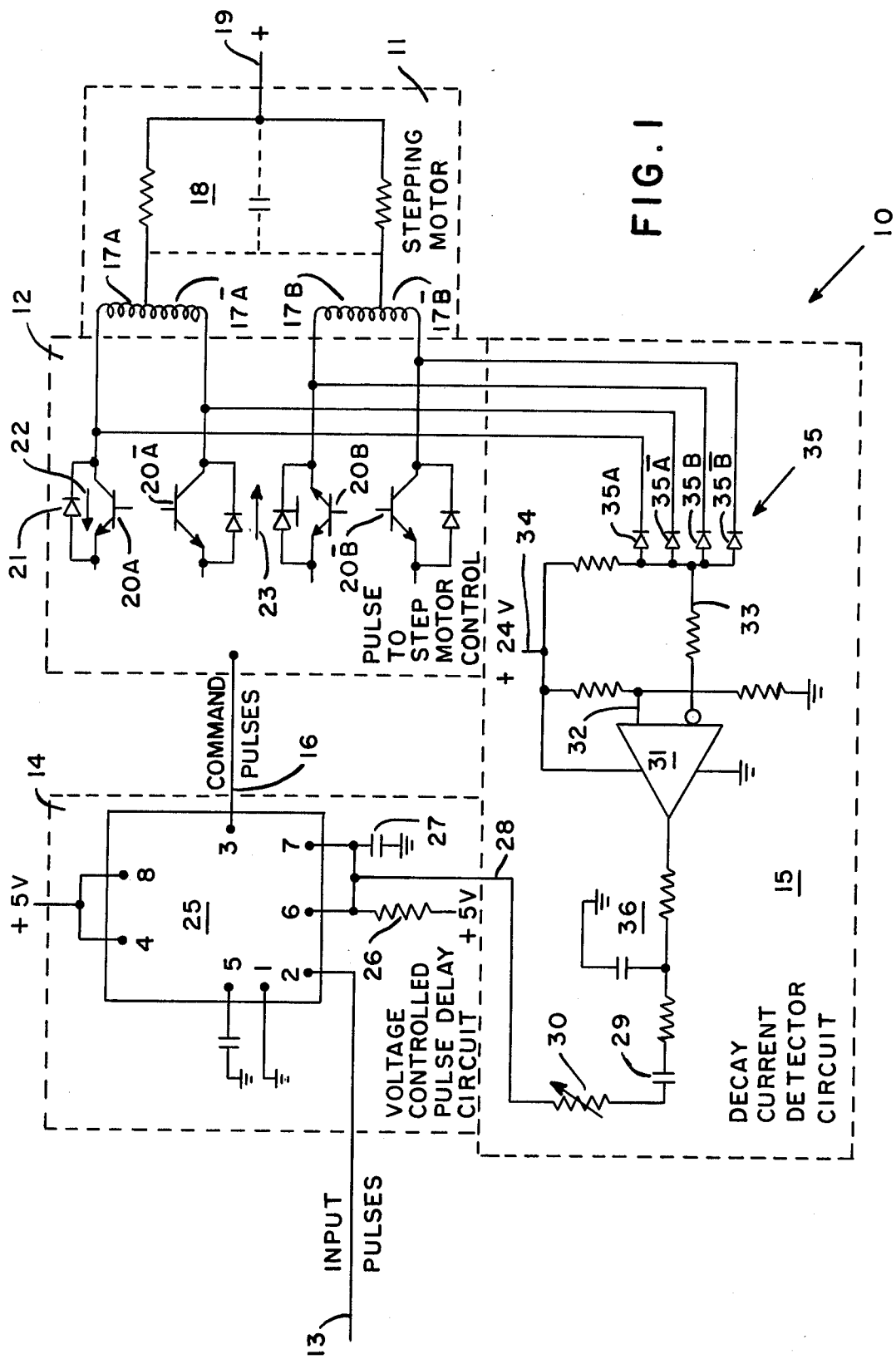
FIG. 1 is a block and schematic diagram showing one embodiment of the present invention for a stepping motor having bifilar windings.

Referring to the drawing, the present invention is generally indicated by the reference numeral 10 and includes a stepping motor 11 and a pulse-to-step motor control 12 of the type disclosed in the above-noted patents. Input pulses are received on a line 13 and would normally be received directly by the pulse-to-step motor control 12 to essentially instantaneously effect a change of energization of the windings of the stepping motor 11. In accordance with the present invention, however, a voltage controlled delay circuit 14 is interposed between the input pulses and the motor control 12 with the extent of the delay being controlled by a decay current detector circuit 15.

The detector circuit 15 receives information from the winding energizing leads between the motor 11 and the control 12, processes such information and alters the extent of the delay introduced by the delay circuit 14. Accordingly, each input pulse on the lead 13 is introduced to the delay circuit 14 and then after a selected delay, is transferred into a command pulse that appears on a lead 16 to the pulse-to-step motor control which in turn then functions to essentially instantaneously change the energization of the windings of the stepping motor 11.

The motor 11, and circuits 12, 14 and 15 are broadly defined by dotted line blocks with the specific components of each being included within the block.

The stepping motor 11 has four windings indicated by the reference characters 17A and 17$\overline{A}$ and 17B and 17$\overline{B}$. The windings 17A and 17$\overline{A}$ are interconnected to a center tap as are the windings 17B and 17$\overline{B}$ with the center taps being connected through a resistive capacitive circuit 18 to a source of positive power 19. The circuit 18 provides resistance in the motor circuit and may take any one of many conventional forms such as split resistor, common resistor, or common resistor with capacitor bypass as diagrammatically shown in solid and dotted lines.

The other end of each of the windings is connected to a transistor, such as transistor 20A and 20$\overline{A}$, 20B and 20$\overline{B}$, respectively. A diode is connected across the collector emitter path of each transistor for conduction in the direction shown with the diode for the transistor 20A being indicated by reference numeral 21.

As explained in the previously noted patent (−268), the control 12 accepts a command pulse on the lead 16 and changes the conduction and non-conduction of the four transistors 20 so that in a typical four step sequence, each command pulse will cause either the winding 17A to become deenergized and the winding 17$\overline{A}$ to be energized or vice-versa or the winding 17B to become deenergized and the winding 17$\overline{B}$ energized or vice-versa. Thus, each change of energization causes one of the windings of the two winding sets to become deenergized and its associated winding to be energized.

Figure 2:
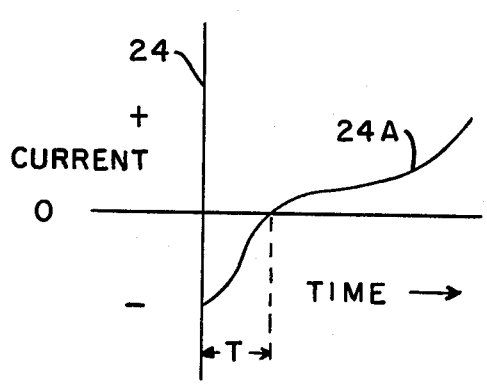
FIG. 2 is a plot of current flow versus time that occurs during a typical change of energization in such a motor.

Shown in FIG. 2 is a plot of current flow in a bifilar winding type motor 11 when a typical change of energization occurs. Assuming for example, that the transistor 20A is conducting energizing the winding 17A while the winding 17$\overline{A}$ is not energized by its transistor being non-conducting, receipt of a command pulse on the lead 16 causes essentially simultaneously the transistor 20A to become non-conducting which stops power current flow from the source 19 through the transistor in the direction of an arrow 22. The flux created by the winding 17A, when energized in its stator pole, desires to continue to have current flow because of its inductive characteristics. In the embodiment shown, this creates decay current flow in the direction indicated by an arrow 23 through the diode across the transistor 20$\overline{A}$ as the transistor 20$\overline{A}$ has been rendered conducting for current flow from the source 19. This decay current is reversed or opposite to the current from the source 19 which subsequently flows in the same direction as the arrow 22 through the transistor 20$\overline{A}$. Thus, there is a time, as shown on the plot in FIG. 2, during which there is flowing a decay current that is negative with respect to the power energizing current. The vertical line 24 in FIG. 2 indicates the instant when the transistor 20A is rendered non-conducting and the transistor 20$\overline{A}$ conducting, while a line 24A represents the current through the winding that is being energized, specifically the winding 17$\overline{A}$. A decay current thus produces a negative voltage across the collector emitter path of the transistor 20$\overline{A}$ for a duration T which has an extent that begins from the time when the change of energization occurs until the time when the current value is zero. Thereafter for the remainder of the time that the transistor 20$\overline{A}$ is conducting, the voltage across the transistor will be its normal conducting voltage drop.

A decay current is caused to exist almost each time a change of energization occurs and hence there is a duration T during which decay current is induced to flow for every step that the motor takes. When the rotor is exactly in synchronism with the rotating stator field, the duration of T will have a normal value for a motor which as a typical example may be 1 millisecond at 800 steps per second while when the rotor is accelerating with respect to the rotating magnetic stator field, the duration of T is lesser. Conversely, when the rotor is decelerating with respect to the stator field, T has a greater duration.

Applicants make use of this discovery of the variation in the duration of the time T to control when a command pulse is to be supplied on the lead 16 and a change of energization produced in order to vary the speed of the stator magnetic field to cause it to reduce the deviation of the rotor. The reduction in deviation enhances the motor's ability to maintain synchronism.

In accordance with the method and system of the present invention, upon receipt of an input pulse, a nominal delay is introduced before it is transferred into a command pulse on the lead 16. One manner of determining the extent of the nominal delay is to set it at about one-half the time between input pulses when the pulses are arriving at a rate which produces the maximum speed at which the motor is expected to operate. Thus, if the maximum motor speed is 5,000 steps per second so that there are 200 microseconds between input pulses, the nominal delay is set at about 100 microseconds. With this length of delay, it is assured that every input pulse will become a command pulse before the next input pulse is received and thus every input pulse effects a change of energization to produce a motor step before the next input pulse is received. However, as will be understood, the variation in the time when the change of energization is effected, does not vary the stepping velocity of the motor as set by the rate of the input pulses.

It has been found that the variation of the delay to minimize the tendency of a motor to oscillate need alter this nominal delay time basically no more than +10% so that the delay ranges in this particular embodiment generally between 90 and 110 microseconds. It is also noted that the decay current duration varies from motor to motor and may vary during the operation of the motor even when the rotor is synchronously aligned with the stator field. In the present method and system, the altering of the transferring delay is not made to be exactly numerically proportional to the actual extent of the duration but is influenced by the change in the decay current duration between changes of energization. If the duration becomes stable by remaining at the same extent for a plurality of changes, then the system tends to gradually change the transferring delay to its nominal value, irrespective of the numerical extent of the stable duration. Accordingly, the present invention is usable essentially universally with different motors and different applications, basically without adjustment, as the method and system is responsive to changes in the delay current duration rather than solely to its exact value.

Referring to FIG. 1, the delay circuit 14 includes a timer 25 such as a monolithic timing circuit type NE/SS555 available from Signetics Corporation and which has the terminals 1 through 8 as indicated. The input pulse lead 13 is connected to the 2 terminal while command pulses are produced on the lead 16 connected to the 3 terminal, with both the input and command pulses consisting of a change of voltage from high to low. In the operation of the timer 25, the receipt of an input pulse causes the 3 terminal to immediately become high for a duration determined by the values of an RC network that includes a resistor 26 and a capacitor 27 connected, as shown, to the 6 and 7 terminals. The duration of the high time depends upon these values with the time ceasing when the voltage across the capacitor 27 equals two-thirds of the voltage applied to the 8 terminal, which as indicated, may be 5 volts. The 3 terminal voltage then shifts to low producing a command pulse to the motor control 12. The delay time for transferring an input pulse into a command pulse is thus the high voltage time of the 3 terminal.

The decay current detector circuit 15 is connected to the delay circuit 14 by a lead 28 to the junction of the resistor 26 and capacitor 27. Without the lead 28, the values of the resistance and capacitor are selected to produce the nominal delay of, for example, 100 microseconds. When current is caused to flow in the lead 28 it will effect a charging of the capacitor 26 quicker than nominal and hence produce a shorter delay while if current is, in effect, withdrawn by the lead 28, the charging time increases beyond the nominal time.

The detector circuit 15 has a condenser 29 that has one side connected through an adjustable resistor 30 to the lead 28 and its other side connected to the output of an operational amplifier 31, such as a type 5558 available from Signetics Corporation. The amplifier is an infinite gain amplifier and its output is essentially either 0 or 12 volts depending upon the relative values of the voltage at its input terminals 32 and 33.

The input 32 is connected to a + voltage source 34 so that it has effectively applied thereto a steady voltage of a + one-half volt while the input terminal 33 is connected to four parallelly connected diodes 35A, 35$\overline{A}$, 35B and 35$\overline{B}$ which in turn are connected to the junction between their respective transistors and windings. For example the diode 35A is connected between the collector of transistor 20A and the end of the winding 17A. Thus, the four diodes connected as shown will cause the voltage on the input 33 to be responsive to the existence of decay current for each change of energization of the windings.

In the absence of a decay current, the numerical value of the nominal voltage at the input 32 is greater than that at the input 33 which may be generally 1½ volts and hence the output voltage of the amplifier 31 will be 0 volts. When decay current exists, the voltage value at the input 33 decreases to less than the voltage value at the input 32 and the amplifier 31 will produce an output voltage of essentially 12 volts for the duration that such a condition exists. The condition produces at the anode of any one of the diodes 35 a voltage less than .75 volts, the voltage drop across each of the diodes 35 and continues until the decay current is insufficient to overcome the diode voltage drop. Thus, the charge on the condenser 29 is dependent upon the length of time that the decay current exists from when the change of energization occurs to essentially a zero value.

In the operation of the system, upon the sensing of a decay current caused by the change in energization directed by a command pulse, the ouptut of the amplifier will go high and supply charging current to the capacitor 29 for the duration that the voltage on the input terminal 33 is numerically less than that on the input 32. When the latter condition stops by the decay current becoming essentially zero, the charge remains on the capacitor, though perhaps decaying somewhat through the grounded 7 terminal of the timer 25 until the next input pulse is received. The capacitor 27 then begins charging and the 3 terminal of the timer goes high. When the voltage on the capacitor 27 equals 2/3 V$_{cc}$, the command pulse appears.

If during this high time of the 3 terminal, the voltage on the lead 28 caused by the charge of the capacitor equals 2/3 V$_{cc}$, the delay in the transferrence of the input pulse to the command pulse will be nominal delay. If the lead 28 has a higher voltage caused by the capacitor 29 being charged longer by the amplifier 31 because of the decay current existing longer, the transfer delay will be shorter by the lead 28 supplying additional charging current to the capacitor 27. If the voltage on the lead 28 is less than 2/3 $V_{cc}$, caused by the charging of the capacitor 29 by a lesser time by the amplifier 31 because of a lesser duration of decay current, the delay will be increased as the lead 28 subtracts from the charging rate of the capacitor 27. Thus, the extent of the decay current caused by one change of energization is used to inversely control the transfer delay for the next change of energization.

The various factors affecting the delay tends to stabilize so that when a plurality of successive constant extent durations of decay current occur, the delay approaches the nominal delay.

A filter circuit 36 has been found helpful to absorb spurious voltages and tends to average the value of the charge on the condenser 29.

Figure 3:
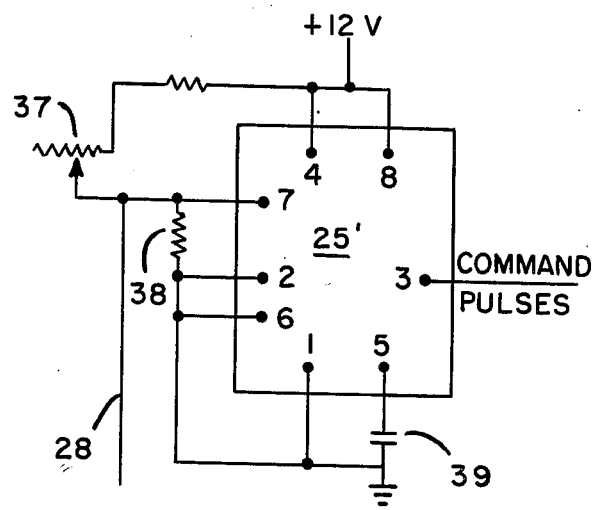
FIG. 3 is a block and schematic diagram of a further embodiment of the present invention.

Shown in FIG. 3 is a further embodiment of the present invention in which the same components are utilized as in FIG. 2, except that the same timer 25 is connected differently so as to produce its own input pulses and thus function as an adjustable rate oscillator which may be used to control the speed of the motor 12. The timer is indicated by reference numeral 25' and includes the eight terminals connected as shown with again its 3 terminal being the terminal on which command pulses appear. The input pulse rate is determined by the setting of an adjustable resistance 37 connected as shown. The lead 28 from the decay current detector 14 is connected to the 7 terminal while the RD network for providing the nominal delay includes a resistor 38 and a condenser 39. In this embodiment, the setting of the resistor 37 determines the rate at which the 3 terminal becomes high and the RC components 38 and 39 together with the voltage on the lead 28 set the extent of the high duration before the voltage on the 3 terminal shifts to low to produce a command pulse. Thus, an input pulse is considered to occur within the timer 25' each time the 3 terminal turns high with the input pulse being transferred into a command pulse after the transferring delay by the 3 terminal voltage shifting to low.

Figure 4:
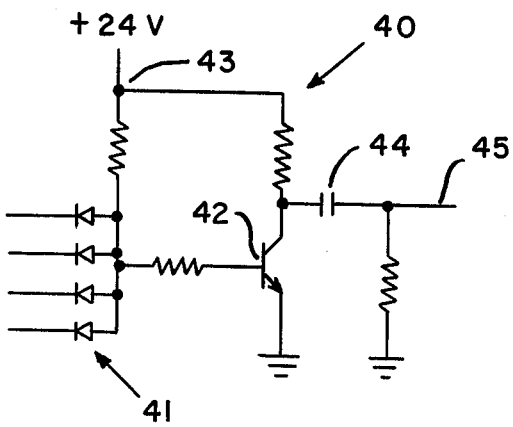
FIG. 4 is a schematic diagram of another embodiment of a decay current detector circuit.

Shown in FIG. 4 is another embodiment of a decay current detector circuit and which is generally indicated by the reference numeral 40. The circuit includes four diodes generally indicated by the reference numeral 41 which correspond to the diodes 35 and a transistor 42 which has its base connected to the diodes and through a resistor to a positive 24 volt source 43. The transistor 42 is normally conducting in its collector emitter path thereby maintaining a low charge on a capacitor 44 connected to the path and to a lead 45 with the latter corresponding to the lead 28 and constituting the output of this detector circuit. Upon a decay current existing of the magnitude hereinbefore referred to, the transistor 42 becomes non-conducting, increasing the charge on the capacitor 44 which in turn increases the voltage on the lead 45 so that the longer the transistor 42 is non-conducting, the higher the voltage value on the lead 44 becomes and the shorter the delay in the transference of an input pulse to a command pulse.

Figure 5:
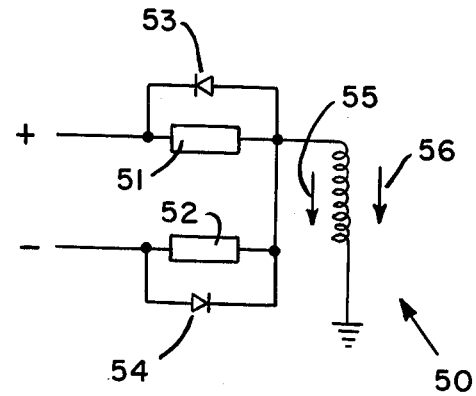
FIG. 5 is a sketch of the energizing circuit for a bipolar motor winding.

While the above disclosure has referred to a stepping motor having bifilar windings, namely, two windings on the same magnetic pole of the stator, the present invention is also applicable to bipolar energized windings in which there is only one winding on a stator. In this latter type of winding energization, the current through the winding is reversed with each change of energization so as to reverse the magnetic polarity of the pole. In FIG. 5 such a bipolar winding is indicated by the reference numeral 50 and is alternately energized through one of two switching devices 51 and 52 from a bipolar D.C. power source. Diodes 53 and 54 are connected across the switching devices in the manner shown. When the switch 51 is conducting, the current flows in the direction of the arrow 55 and upon termination of conduction of the switching device 51, a decay current will occur in the direction of the arrow 56 which is of the same polarity as the terminated energizing current. The extent of the decay current from the time of the switching off of the switching device 51 until the current reaches a value of essentially zero may be sensed and used to alter the delay in the transference between an input pulse and a command pulse in order to minimize the tendency of such a motor to oscillate. One form of a bipolar winding motor is shown in U.S. Pat. No. 3,728,598 assigned to the assignee of the present invention.

Figure 6:
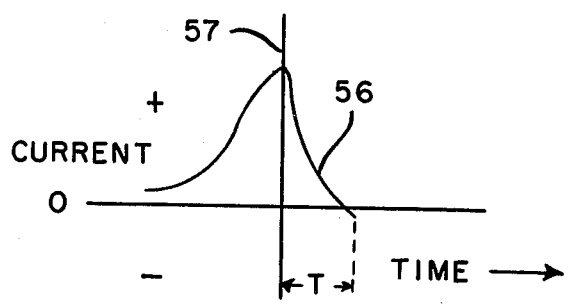
FIG. 6 is a plot, similar to FIG. 2 for a bipolar winding change of energization.

Shown in FIG. 6 is a plot of the current through the winding 50 that occurs with a change of energization with time being indicated on the abscissa and with a line 57 representing when the change happens. The power current represented by the arrow 55 terminates with the change and the decay current 56 of the same polarity is created and decreases to zero before the power current for the next change of energization begins to energize the winding 50. The only essential difference between the decay current of a bifilar winding and that of a bipolar winding is their relative polarity with respect to the next energizing current and hence the extent of either may be employed to minimize the tendency of a motor to oscillate.

It will accordingly be understood that there has been disclosed a motor control circuit that while transferring each input pulse into a command pulse that produces a motor step also minimizes the tendency of the motor to oscillate or flutter at least in its mid-velocity operating range. The system uses a method of determining the extent of the duration of a decay current which has been found to be indicative of the relative position of the motor's rotor and the rotating stator magnetic field to control the instant of stepping in the rotation of the field. This is achieved, for each input pulse received and transferred into a command pulse that essentially simultaneously steps the stator field, by controlling the time of the transference in accordance with the duration of the decay current. The stator field is thus relatively moved with the occurrence of the change of energization to decrease the rotor's deviation with respect thereto so that the inherent characteristic of the motor to maintain synchronism is enhanced and its tendency to oscillate or flutter minimized if not completely obviated.

Variations and modifications may be made within the scope of the claims and portions of the improvements may be used without others.

We claim:

1. The method of minimizing the tendency of a stepping motor to oscillate while at least operating in its mid-velocity range with the motor having a plurality of windings with the energization of the windings being changed essentially simultaneously with the occurrence of a command pulse comprising the steps of determining the receipt of an input pulse, transferring each input pulse after a nominal delay into a command pulse to effect a change of energization, sensing during the occurrence of the change of energization the existence of a decay current in the windings and changing the extent of the delay in the step of transferring the next input pulse into a command pulse in accordance with the sensed extent of the decay current.

2. The invention as defined in claim 1 in which the step of changing the extent of the delay changes the delay no more than approximately ten per cent of the nominal delay.

3. The invention as defined in claim 1 in which the step of changing the extent of the delay increases and decreases the delay extent with respect to the nominal delay.

4. The invention as defined in claim 3 in which the step of changing the delay includes decreasing the extent of the delay for increasing sensed extents of the decay current and increasing the delay for decreasing sensed extents of the decay current.

5. The invention as defined in claim 1 in which the step of transferring includes the step of setting the nominal delay to a value that is no larger than essentially one-half the time between input pulses at the maximum rate that the input pulses are to be received.

6. The invention as defined in claim 1 in which the step of changing the extent of the delay includes the step of sensing the duration that the decay current exists and decreases to essentially zero.

7. The method of minimizing the tendency of a stepping motor to uncontrollably oscillate while at least operating in its mid-velocity range with the motor having a plurality of windings whose energization is repeatedly changed to produce a rotating stator magnetic field that attracts a rotor comprising the steps of sensing at the beginning of each change of energization the relative deviation of the rotor with respect to the stator field, determining if there is a difference in the relative deviation at least between successive changes and altering the speed of the rotating field to decrease the difference by controlling the instant when the stator field is energized to assume its next rotative position.

8. The invention as defined in claim 7 in which the motor has its energization changed with each input pulse received with there being an interval between successive input pulses and in which the step of altering is limited to controlling the instant when the change occurs to having the change occur during the interval.

9. The invention as defined in claim 8 in which the step of altering causes the change to occur during the initial half of the interval.

10. The invention as defined in claim 7 in which the motor has its energization changed for each input pulse received with the pulses being received at a selected rate and in which the step of altering maintains the stepping speed of the motor equal to the selected rate of the input pulses.

11. A motor control circuit for translating each input pulse received into a change of energization of the windings of a stepping motor to produce a step while reducing the tendency of the motor to oscillate at least while operating in its mid-velocity range comprising means for receiving input pulses and transferring each input pulse into a command pulse and means for receiving each command pulse and for essentially simultaneously therewith producing a change of energization to the motor, said receiving and transferring means including means for providing a nominal delay in the transferring and means for altering the extent of the nominal delay to control the instant a change of energization is to occur and in which the means for altering includes means for sensing the duration of a decay current created during a change of energization and for altering the extent of the delay in transferring the next input pulse to a command pulse in accordance with essentially the inverse of the sensed duration.

12. The invention as defined in claim 11 in which the means for providing the nominal delay includes components having values that set the extent of the nominal delay to essentially one-half the time between successive input pulses at the maximum rate to be received by the motor control circuit.

13. The invention as defined in claim 11 in which the means for altering alters the nominal delay by no more than essentially plus or minus 10% of the nominal delay.

14. The invention as defined in claim 11 in which the means for altering includes means responsive to the value of a signal with the values of the signal greater than a set value shortening the delay and values of the signal less than the set value lengthening the delay.

15. The invention as defined in claim 14 in which the means for altering includes means for providing the signal with its value being related essentially to the duration that a decay current exists during a change of energization.

16. The invention as defined in claim 15 in which the means for providing a signal includes a capacitor, means for supplying energy to charge the capacitor from the time the change of energization occurs until the value of the decay current is essentially zero and in which the value of the charge on the capacitor is the signal.

17. The invention as defined in claim 16 in which the means for supplying energy includes an amplifier having a pair of inputs and an output connected to the capacitor, means for maintaining one input at an essentially constant voltage and means for applying to the other input a lesser voltage for essentially the duration that a decay current exists.

18. The invention as defined in claim 16 in which the means for supplying energy includes a transistor having a base, emitter and collector, means connecting the transistor to be normally conducting, means for causing the transistor to be essentially non-conducting for essentially the duration that a decay current exists and means connecting the capacitor to the collector of the transistor.

19. The invention as defined in claim 15 in which the means for receiving and transferring includes a monocylic timer having an input and an output having two states, means for receiving the input pulses on the input and causing the output to achieve a one state upon the receipt of each and means for maintaining the output at the one state for the extent of the delay and then shifting to its other state with the shifting producing a command pulse.

20. The invention as defined in claim 15 in which the means for receiving and transferring pulses includes a monocylic timer having an output having two states, means for causing the output to attain a high state at a selected rate with each high state constituting an input pulse and means for maintaining the output at the one state for the extent of the delay and then shifing to its other state with the shifting producing a command pulse.

21. The invention as defined in claim 15 in which the change of energization includes the energization of a winding that had been deenergized and in which the decay current is of the opposite polarity to the current energizing the winding.

22. The invention as defined in claim 15 in which the change of energization includes reversing the current flow through a winding that had current flowing previously therethrough and in which the decay current has the same polarity as the previously flowing current.

* * * * *